United States Patent
Perkinson et al.

(10) Patent No.: US 6,511,292 B2
(45) Date of Patent: Jan. 28, 2003

(54) BACKUP GOVERNING SYSTEM FOR A VARIABLE PITCH PROPELLER

(75) Inventors: Robert H. Perkinson, Enfield, CT (US); Charles F. Stearns, East Longmeadow, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 13 days.

(21) Appl. No.: 09/892,264

(22) Filed: Jun. 27, 2001

(65) Prior Publication Data

US 2003/0002983 A1 Jan. 2, 2003

(51) Int. Cl.[7] .................................................. B63H 3/08
(52) U.S. Cl. ........................ 416/48; 416/52; 416/157 R
(58) Field of Search ............................. 416/45, 47, 48, 416/52, 157 R

(56) References Cited

U.S. PATENT DOCUMENTS

| | | | | |
|---|---|---|---|---|
| 3,635,583 A | * | 1/1972 | Chilman et al. ........... | 416/48 X |
| 4,588,354 A | * | 5/1986 | Duchesneau et al. ...... | 416/48 X |
| 4,645,420 A | * | 2/1987 | Warner ....................... | 416/48 |
| 5,037,271 A | * | 8/1991 | Duchsneau et al. ...... | 416/157 R |
| 5,042,966 A | * | 8/1991 | Schwartz et al. ......... | 416/157 R |
| 5,836,743 A | * | 11/1998 | Carvalho et al. ..... | 416/157 R X |
| 5,897,293 A | * | 4/1999 | Arel et al. ................ | 416/48 X |

* cited by examiner

*Primary Examiner*—Edward K. Look
*Assistant Examiner*—Richard A. Edgar

(57) ABSTRACT

A backup governing system for a variable pitch propeller, carried by the propeller hub which is hydraulically interposed between a main control for the propeller and a propeller blade moving, double acting piston, the backup governing system comprising a spool valve including a spool movable between a plurality of metering positions along with first and second opposing springs applying oppositely directed biasing forces to the valve member. A flyweight assembly is connected to the spool and applies a speed dependent valve positioning force to the spool in opposition to a first of the springs and in addition to the second of the springs. A piston valve is operatively associated with the second spring and operable to change the bias applied by the second spring to the spool.

20 Claims, 2 Drawing Sheets

BACKUP GOVERNING SYSTEM FOR A VARIABLE PITCH PROPELLER

FIELD OF THE INVENTION

This invention relates to variable pitch propellers used on aircraft, and more specifically, to an improved backup governing system for such propellers.

BACKGROUND OF THE INVENTION

Variable pitch propellers are employed on many differing types of aircraft having power plants ranging from piston engines to gas turbines. Conventionally, such systems include redundant main control systems with one of the control systems being operable to take over the pitch control function if the other main system malfunctions. Moreover, it is common practice to provide a backup governing system for the redundant main control systems, particularly where the main control systems are electronic pitch control (EPC) systems. The backup governing system should be capable of determining when a propeller overspeed condition exists and causing propeller blades to move toward a coarse pitch condition which is sufficient to slow the rate of rotation of the propeller to a maximum allowable speed.

In addition, the backup control system should also be capable of determining when a low pitch condition (also referred to as a "low pitch stop") exists wherein the pitch of the propeller becomes less than that defined as a minimum, in-flight allowable pitch (often called "flight idle" pitch) and cause the propeller blades to return to a coarser pitch that is at least equal to or greater than the flight idle pitch.

Still further, if the variable pitch propeller system is one where the pitch of the blades can be changed to cause a reverse thrust condition, as, for example, employed at slowing an aircraft on a runway just after having landed, the backup governing system must include provision for manually disabling the backup functions providing overspeed protection and low pitch stop.

As propeller pitch control systems, including EPC systems conventionally employ hydraulic fluid under pressure as a means for controlling the pitch of the propeller blades, it is highly desirable to provide a backup control system which is operable notwithstanding flight conditions such as a momentary loss of hydraulic power. It is also desired to eliminate mechanical gear trains or other connections between the rotating and stationary parts of the propeller.

Furthermore, an additional constraint is the requirement that the backup governing system interfaced with three existing pressure signals which are available to the propeller from its control. This constraint minimizes cost and enhances the ability to retrofit a system on existing propeller control systems.

The present invention is directed to overcoming one or more of the above problems.

SUMMARY OF THE INVENTION

It is the principal object of the invention to provide a new and improved backup governing system for a variable pitch propeller. More specifically, it is an object of the invention to provide such a system wherein the components are carried by the propeller, eliminating a mechanical interface for the backup control between rotating and stationary parts of the propeller system and which may interface with existing pressure signals in a conventional system.

An exemplary embodiment of the invention achieves the foregoing object in a variable pitch propeller system that includes a rotatable propeller hub that is adapted to be driven by a prime mover. A double acting piston is carried by the hub and propeller blades having shanks journaled in the hub are provided. A linkage connects the piston to the shanks so that movement of the piston will cause rotation of the shanks within the hub. A transfer bearing is provided for providing at least first and second streams of hydraulic fluid under pressure. The first stream is adapted to be applied to one side of the piston and the second stream is adapted to be applied to the opposite side of the piston. A main control is provided for regulating the pressures of the first and second streams to set the pitch of the blades and the hub. According to the invention, there is provided a backup governing system carried by the hub and hydraulically interposed between the main control and the piston and which includes a metering valve having a metering valve member movable between a plurality of metering positions, first and second, opposing biasing elements applying oppositely directed forces to the valve member, a flyweight assembly connected to the valve member applying a speed dependent valve positioning force to the valve member in opposition to the first biasing element and in addition to the second biasing element. Also included is an actuator that is operatively associated with the second biasing element and which is operable to change the bias applied by the second biasing element to the valve member. A first stream control valve is connected to the actuator and is interposed between the transfer bearing and the piston and is operable to control the flow of the first stream to the one side of the piston.

In a preferred embodiment, the first stream is a stream that moves the propeller pitch towards a fine pitch condition and the second stream is a stream that moves the propeller towards a coarse pitch position.

In one embodiment of the invention, the actuator includes an actuator piston having a side hydraulically connected to the metering valve. The metering valve is operable to direct the first or fine pitch stream to the actuator piston side when the metering valve member is moved by the flyweight assembly to a predetermined position indicative of an undesirable occurrence in the operation of the system as, for example, an overspeed condition or a low pitch condition.

In one embodiment, a linkage path, from the double acting piston to the flyweight assembly changes the spool of the flyweight assembly from a force control valve to a motion control valve whenever a low pitch stop is required. When this occurs the flyweight assembly simply becomes another link in the path. The link that follows the cam has enough mass so that it always follows the cam, thus, movement of the double acting piston, during a low pitch condition will move the spool valve directly without any spring or flyweight force influencing the motion of the valve.

One embodiment of the invention contemplates that the actuator and the first or fine pitch stream control valve include a piston valve having a piston surface hydraulically connected to the metering valve to receive the first or fine pitch stream when the metering valve is moved to a predetermined position by the flyweight assembly. Also included is a valve surface for halting flow of the first or fine pitch stream to the double acting piston when the metering valve is moved to the predetermined position by the flyweight assembly.

Preferably, the metering valve is a spool valve and the metering valve member is a spool having opposite ends. The first biasing element and the flyweight assembly are connected to one of the spool ends and the second biasing element is connected to the other of the spool ends.

Preferably, the biasing elements are springs.

The invention also contemplates the provision of a reverse enabling valve hydraulically interposed between the actuator piston and the metering valve and operable to prevent the first or fine pitch stream from being applied to the actuator piston side. In this embodiment, the reverse enabling valve may be a hydraulically operated valve responsive to a hydraulic signal in the form of a third stream of hydraulic fluid passing through the transfer bearing.

The invention also contemplates the provision of a hydraulic discharge path in fluid communication with the double acting piston fine pitch side, a flow limiter in the discharge path, and a valve operated bypass about the flow limiter.

The flow limiter may be an orifice and the discharge path operates as a hydraulically operated pitch delay valve.

Other objects and advantages will become apparent from the following specification taken in connection with the accompanying drawings.

DESCRIPTION OF THE PREFERRED EMBODIMENT

Figure 1:
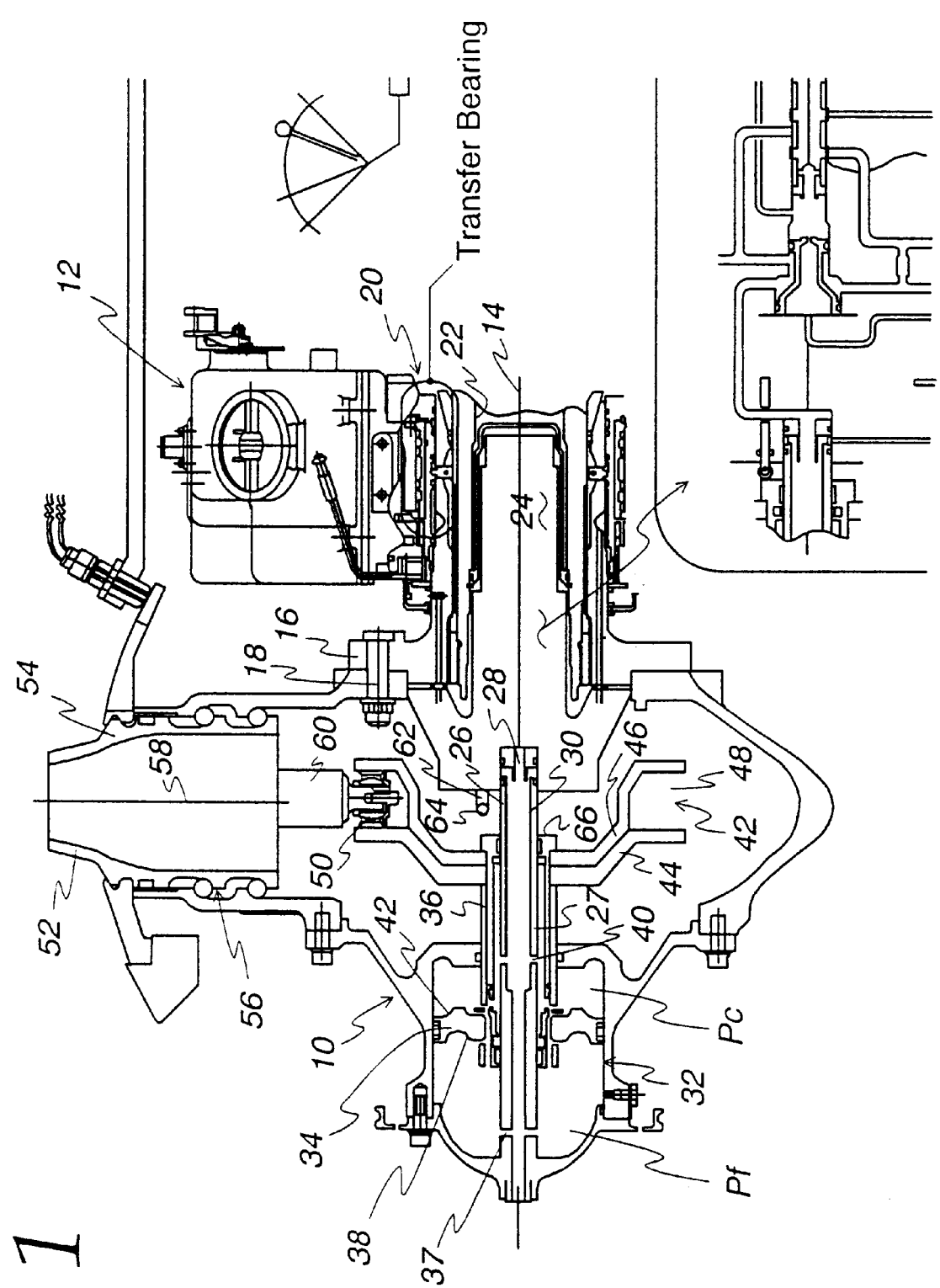
FIG. 1 is a sectional view of a variable pitch propeller embodying invention.

An exemplary embodiment of a variable pitch propeller system made according to the invention is illustrated in the drawings and with reference to FIG. 1 is seen to include a rotatable hub, generally designated 10, constituting the rotatable side of the variable pitch propeller system, and a stationary side, generally designated 12, of conventional construction. The hub 10 is rotatable about an axis 14 and is driven by any suitable power plant, most often a gas turbine engine (not shown). A shaft 16 is bolted as by bolts 18 to the hub 10 and is journaled for rotation about the axis 14 by bearings including a transfer bearing, generally designated 20 of conventional construction. The transfer bearing 20, in addition to journaling function, serves as an interface between the hub 10 and the stationary part 12 of the propeller system by serving to transmit, as is conventional, three streams of hydraulic fluid. One such stream commands the propeller system towards a coarse pitch and is designated $P_c$. Another stream is operative to bias the propeller towards a fine pitch condition and is designated $P_f$. The third stream is a governor disable signal and is designated $P_{gds}$. The stream's $P_f$ and $P_c$ will be at selected variable, elevated pressures controlled by an EPC (not shown) or other conventional control while the stream $P_{gds}$ will typically be at one or the other of two different pressure values.

Figure 2:
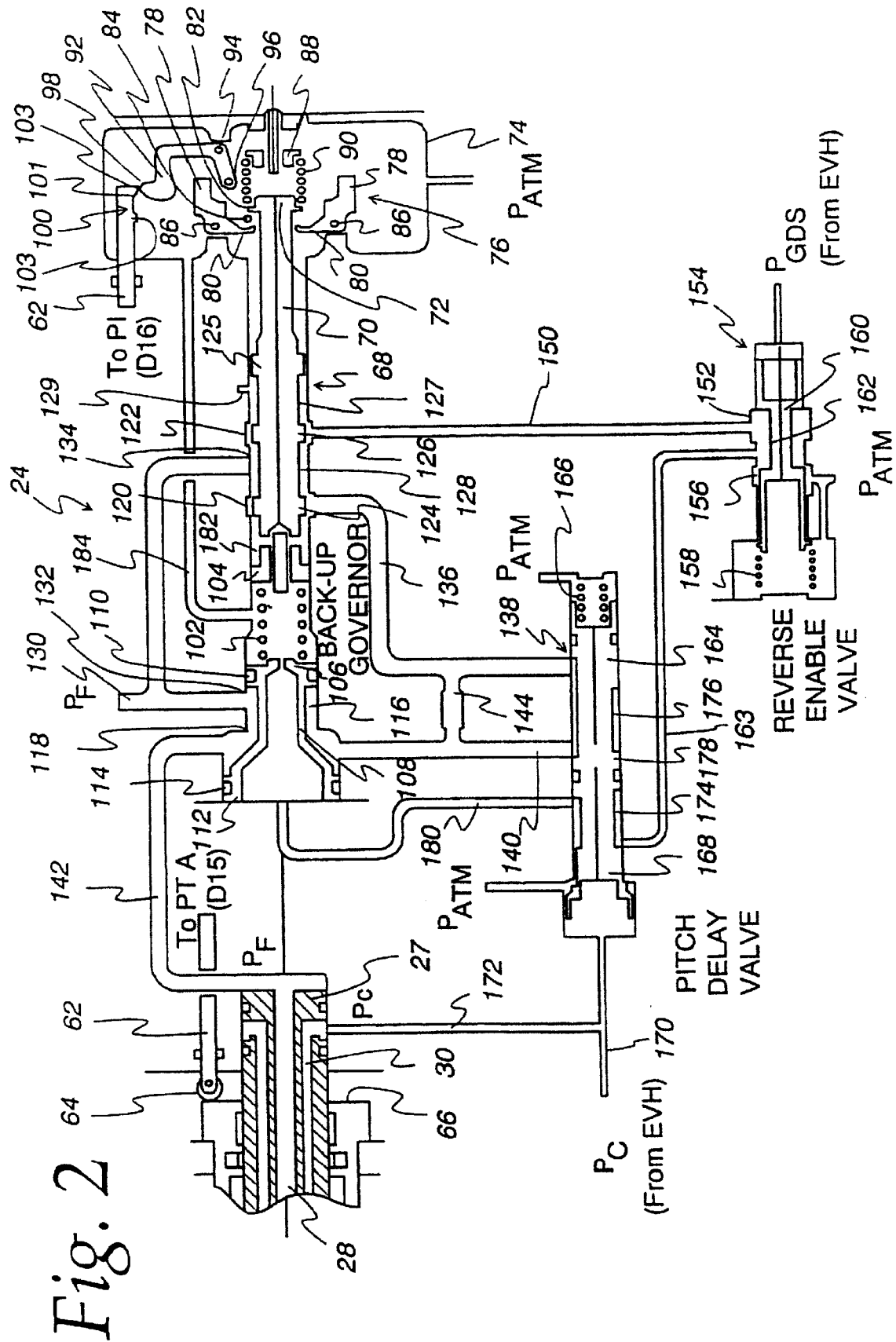
FIG. 2 is an enlarged, partial schematic, partial mechanical view of a backup governing system for the variable pitch propeller and made according to the invention.

The shaft 16 includes an interior cavity 22 in which a valving system, generally designated 24, and shown in FIG. 2 is contained. The valving system 24 communicates in a manner to be seen with a shaft/transfer tube 26 and a concentric transfer tube 27 having a central flow path or conduit 28 and a concentric flow path 30, formed by the shaft/transfer tube 26 and the transfer tube 27, which respectively receive the streams $P_f$ and $P_c$. The shaft/transfer tube 26 extends into a double acting hydraulic cylinder, generally designated 32 having a double acting piston 34 therein. The piston 34 is connected to a piston rod 36 which extends out of the cylinder 32 and which is reciprocally mounted on the shaft/transfer tube 26 for movement along the axis 14. The central conduit 28 in the shaft 26 opens through a radial port 37 to a first or fine pitch side 38 of the piston 34. At the same time, the concentric conduit 30 opens via a port 40 to the opposite or coarse pitch side 42 of the piston 34.

Within hub 10, and disposed between the double acting cylinder 32 and the valve assembly 24, the piston rod 36 mounts a conventional reciprocating to rotary motion converting mechanism, generally designated 42. This mechanism may be of any conventional form and as illustrated, includes a pair of bell-shaped plates 44,46 that are abutted near their center and at their point of connection to the piston rod 36. They are separated to provide a bearing receiving space 48 at their peripheries.

A self-aligning spherical bearing 50 is located in the space 48 for each of a plurality of propeller blades 52 carried by the hub 10. The blades 52 have shanks 54 which are journaled to the hub 10 and retained in the hub 10 by a retention bearing system, generally designated 56, of conventional construction. The rotational axis of one blade is shown at 58 and it will be observed that the shank 54, at its radially innermost end, includes an eccentrically located pin 60 on which the bearing 50 is mounted. As a consequence, when the piston 34 moves within the cylinder 32, the reciprocating to rotary motion converting mechanism 42 reciprocates along the axis 14 and such motion, because of the eccentricity of the pin 60, is converted to rotary motion of the blades 52 within the hub 10. As viewed in FIG. 1, when the piston 34 is moved to the left, the blades 52 will be pivoted towards a coarse pitch position. Conversely, when the piston 34 is moved to the right as viewed in FIG. 1, the propeller blades 52 will be moved toward a fine pitch position and, in a case where reverse thrusting propellers are involved, ultimately toward a reverse thrust position.

Finally, with reference to FIG. 1, it is to be noted that a reciprocal push rod 62 optionally having a roller 64 thereon is positioned to be engaged by an end 66 of the piston rod 36 to move reciprocally in a path that is generally parallel to the rotational axis 14. The purpose of this linkage will be described hereinafter.

Turning now to FIG. 2, the backup governing system contained within the valve assembly 24 will be described in greater detail. The system includes a spool valve, generally designated 68, having a spool 70 reciprocally mounted therein. Adjacent one end 72 of the spool 70, a chamber 74 is provided for housing a flyweight assembly, generally designated 76. The flyweight assembly 76 includes a plurality of flyweights 78 that are generally L-shaped and which include arms 80 in operative relation with a radial flange 82 on the end 72 of the spool 70. A bearing 84 is interposed between the ends of the arms 80 and the flange 82 and each of the flyweights 78 is mounted for pivoting movement about a pivot pin 86. As a consequence of this, as the rotational speed of the hub 10 increases, an increasing amount of centrifugal force will be generated within the flyweight assembly 76 which in turn will be conveyed via the arms 80 and the bearings 84 to the flange 82 on the spool 70. This speed dependent force will tend to drive the spool 70 to the right as viewed in FIG. 2.

Also within the chamber 74 is a spring retainer 88 which retains a compression coil spring 90 against the side of the flange 82 opposite the bearings 84. This spring 90 applies a biasing force against the spool 70 that is to the left as viewed in FIG. 2. Suitable means (not shown) are provided for varying the position of the retainer 88 to pre-set the degree of bias applied by the spring 90.

Also within the chamber 74 is a bell crank 92 mounted for pivotal movement by a pivot pin 94. The bell crank 92, at one end, includes a roller 96 that may be abutted against one of the flyweights 78 to move the same. Specifically, the bell crank 92 has sufficient mass to assure this movement of the flyweight 78. The contact occurs on the radially inner side of the flyweight 78 and is such that the motion of the rod 62 in the decrease pitch direction will cause the flyweight 78, either by the addition of mass or by physical displacement to move radially outward. The effect of such is to drive the spool 70 to the right as viewed in FIG. 2 and the resulting action in response to a low pitch condition is similar to that caused by an increase in rotational speed. The other end of the bell crank 92 includes a roller 98 engaged with a cam surface, generally designated 100, on an end of the push rod 62. The cam surface 100 includes a valley 101 between two lobes 103.

It will be observed from FIG. 2 that when the push rod 62 is in the position illustrated, the bell crank 92 will be rotated to a counterclockwise most position with the result that the roller 96 will be at its radially inward most position and out of contact with the flyweight 78. It should be noted that bell crank 92 has enough mass so that it will over power all spring forces in the flyweight system, insuring that it will always be in contact with the cam surface 100. On the other hand, when allowed to contact the flyweight 78, it will physically position the flyweight 78. Thus, when the push rod 62 is moved to the right as viewed in FIG. 2, the roller 98 will follow the cam surface 100 into the cam surface valley 101, thereby allowing the bell crank 92 to pivot in a clockwise direction with the result that the roller 96, in contact with the radially inner side of a flyweight 78, will move the flyweight 78 in the counterclockwise direction. Consequently, in the illustrated embodiment, the bell crank 92 serves to position the flyweight assembly 76. Specifically, when the bell crank 92 is introduced into the flyweight assembly 76, as will occur when a low pitch condition is sensed as will be explained in greater detail hereinafter, the same urges the upper flyweight 78 in a counterclockwise direction about its pivot 86 which allows the lower flyweight 78 to rotate in the clockwise direction, thereby moving the flyweight assembly 76 against the flange 82 of the spool 70. Thus, movement of the spool 70 to the right will occur as a result. The actuator 34, in turn, will reposition the spool to a position where the balance of forces on the actuator will cause equilibrium of the system. In short, when the actuator 34 is positioned in response to a low pitch condition, it will always position the spool 70 accordingly, thereby guaranteeing direct control of the low pitch stop position and the flyweights 78 have no effect at this time.

Still a further biasing force is applied to the spool 70 by a compression coil spring 102 abutted against the end 104 of the spool 70, opposite the end 72. The spring 102 is interposed between the spool end 104 and an end 106 of a piston valve 108. The piston valve 108 has a seal 110 at the end 106 and an enlarged end 112 also bearing a seal 114. The same is disposed in a stepped bore 116 communicating with the bore in which the spool 70 is received. The step is shown at 118 and acts as a valve seat when the piston valve 108 is shifted to the right from the position illustrated in FIG. 2.

Returning to the spool valve 68, the valve body includes two spaced annuluses 120 and 122 while the spool 70, for purposes of the present invention, includes three lands 124,125 and 126 separated by grooves 127 and 128. A conduit 129 opens the groove 127 to the conduit 134, which eventually communicates with the sump pressure. An internal conduit 130 is connected to the transfer bearing 20 (FIG. 1) to receive the $P_f$ stream of hydraulic fluid under pressure. The conduit 130 is connected to a first port 132 within the piston valve 108 and located to the side thereof closest the spring 102. The conduit 130 has a second port 134 which opens to the spool 70 between the annuluses 120 and 122 in the body of the spool valve 68, depending upon the position of spool 70. A conduit 136 is connected to the annulus 120 and extends to a pitch delay valve, generally designated 138. A further conduit 140 extends to the stepped bore 116 on the large side of the step 118 while a further conduit 142 extends from the same location to the central conduit 28 in the shaft/transfer tube 26 and the transfer tube 27. It is to be noted that an orifice 144 interconnects the conduits 136 and 140 in bypass relation to the pitch delay valve 138.

A conduit 150 is connected to the annulus 122 and extends to an annulus 152 in a reverse enable valve, generally designated 154. The reverse enable valve 154 includes a second annulus 156 that is connected to the sump. A biasing spring 158 biases a valve spool 160 within the reverse enable valve 154 toward the right as viewed in FIG. 2 and includes a groove 162 sized to allow fluid communication between annulus 152 and groove 162 when the valve spool 160 is moved to the left. It should be noted that a conduit 163 communicates through the groove 162, with either the annulus 152 or the annulus 156, but not both for any position of the spool 160.

Between the annuluses 152 and 156, the conduit 163 is in fluid communication with the interior of the valve 154 and extends to the pitch delay valve 138. The pitch delay valve includes an internal spool 164 which is biased to the left as viewed in FIG. 2 by a spring 166. An end 168 of the pitch delay valve spool 164 is subjected to the hydraulic stream $P_c$ by a conduit 170, which also includes a branch 172 extending to and in fluid communication with the conduit 30 between the shaft/transfer tube 26 and the transfer tube 27.

The spool 164 includes a pair of grooves 174 and 176 separated by a land 178. The groove 176 is sized to allow fluid communication between the conduits 136, 140 when the valve 164 is in the position illustrated in FIG. 2 while the groove 174 is sized to allow fluid communication between the conduit 163 and a conduit 180 that extends to the large side of the stepped bore 116 and is in fluid communication with the side of the piston valve 108 opposite the spring 102. The land 178 is sized so that when the valve 164 moves to the left from the position illustrated in FIG. 2, communication between the conduits 163, 180 is cut off and communication between the conduits 180 and 140 is established, while communication between the conduits 136, 140 is also cut off, with the exception of flow through orifice 144.

Operation is generally as follows:

In normal operation, the components are generally in the position illustrated in FIG. 2. The spool 70 will be essentially ineffective with flow to the conduit 150 blocked by the land 126, with the conduit 150 ported to sump pressure via the groove 127 and the conduit 129. At the same time, the $P_f$ stream will be directed to the fine pitch side 38 (FIG. 1) of the piston 34 via the conduit 130, the port 132, past the valve seat 118, to the conduit 142 and then to the central conduit 28 within the shaft/transfer tube 26 and the transfer tube 27. Similarly, the $P_c$ stream will be directed via the conduit 170, the branch 172 and the concentric conduit 30 to the coarse pitch side 42 of the piston 34. Control of the pitch of the propeller will then be effected by the relative pressures $P_f$ and $P_c$ in a conventional fashion, i.e., controlled by the electrohydraulic servo valve, or a hydro-mechanical control valve, in the stationary part of the propeller.

In the case of an overspeed condition coming into existence, the flyweight 78 (FIG. 2) will exert an increasing bias against the spool 70 tending to move the same against the spring 90. As that occurs, the groove 128 on the spool 70 begins to meter the $P_f$ stream entering at the port 134 into the annulus 122 from which it enters the conduit 150, passes through the reverse enable valve to the conduit 163, passes through the pitch delay valve 138 to the conduit 180 to be applied to the piston valve 108 on the side there of opposite the spring 102. As a consequence, the piston valve 108 shifts to the right and will close against the seat 118 cutting off the flow of the $P_f$ from the port 132 to the conduit 142. The shifting of the piston valve 108 increases the biasing force applied by the spring 102 to the spool 70 as well as the counteracting force applied to the spool 70 by the spring 90.

The spring constant of the springs 90 and 102 as well as the force supplied by the flyweight 78 is chosen so that the balance of forces positions the spool 70 so that as propeller speed reaches 101.5% of maximum speed, the land 126 begins to open the annulus 122 to the port 134. The resulting movement of the piston valve 108 changes the set point of the system to 103% of maximum speed. It is to be particularly noted that as the spring 102 is further compressed, it tends to cause a greater opening to the annulus 122 at the land 126, thus providing positive feedback, which establishes a new set point at 103% of maximum speed.

As mentioned above, the piston valve 108 will have shifted to the right as viewed in FIG. 2 to close against the seat 118. As a consequence, flow from the conduit 130 to the conduit 142 about the seat 118 is terminated, and the resetting of the set speed to 103% allows speed to increase to 103% before the governor can control the overspeed. At this speed and time, the shifting of the spool 70 to the right allows a groove 182 in the spool to come into fluid communication with the annulus 120. The groove 182 is in fluid communication with a conduit 184 extending to the sump. Thus, the conduit 136 is gradually connected to the sump via the groove 182. The conduit 136 remains connected to the central conduit 28 in the shaft/transfer tube 26 leading to the fine pitch side 38 (FIG. 1) of the double acting piston 34. Hydraulic fluid on that side of the piston is then permitted to flow to the sump out of the center conduit 28, through the conduit 142 to the conduit 140 and either through the orifice 144 or the groove 176 in the pitch delay valve 138 to the conduit 136. Thus, pressure is relieved in the double acting cylinder 32 allowing the rotational and aerodynamic force existing in the propeller assembly and the $P_c$ pressure signal to urge the piston 34 to the left as viewed in FIG. 1 thereby increasing the propeller pitch in the coarse direction.

As a consequence, propeller speed will begin to diminish as the pitch increases resulting in the flyweight 78 applying a lesser biasing force to the spool 70 which tends to allow the spool 70 to shift to the left until the new equilibrium point is established by the movement of the piston valve 108 is reached. At this time, the land 124 will be modulating flow to or from the fine pitch side 38 of the piston 34 to the sump or from groove 134 at the annulus 120. Essentially, the main control system has been locked out by shifting of the piston valve 108 until propeller speed decreases to 100% of maximum speed, at which time the flyweight 78 allows the spool 70 to return to its normal-operating position. If one or the other of the main controls is operating properly, propeller pitch to prevent overspeed is maintained by it. If not, as speed increases, the backup system again cycles into backup operation as described above.

In a low pitch condition, the same sort of action occurs. However, in this particular case, it is initiated by the push rod 62 being engaged by the end 66 of the piston rod 36 to cause the cam 100 to cause the bell crank 92 to physically position the flyweight assembly 76. Consequently, the spool 70 now becomes a motion control valve rather than a force control valve and pitch is increased.

When it is desired to reverse pitch, a manual control is shifted to the conventional ground stop position. This in turn energizes a solenoid valve (not shown) which allows the stream $P_{gds}$ signal to be applied to the right-hand side of the reverse enable valve 154. The resulting shift of the spool 160 causes the groove 162 to establish fluid communication between the line 161 and the sump while cutting off flow from the annulus 152. As a consequence, the piston 108, if not already in the position illustrated in FIG. 2, will he shifted back to that position primarily by the balance of pressure forces on piston 108 and secondarily by the bias of the spring 102. At the same time, the flow path to the conduit 180 is cut off within the reverse enable valve 154 to again prevent the piston valve 108 to be shifted to the right. Consequently, the backup governing system is disabled, allowing the propeller to be operated below flight idle or even in the reverse thrust position.

In some instances, during aircraft maneuvers that could result in so-called negative G's coming into effect, oil pressure may be temporarily lost. In such a situation, it is not desirable that a rapid pitch change in the propeller occur during normal operation. In such a situation, the pressures of streams $P_f$ and $P_c$ may momentarily drop. When $P_c$ drops in pressure it allows the spring 166 to move the spool 164 of the pitch delay valve to the left as viewed in FIG. 2.

This not only cuts off communication between the conduits 163, 180, but it also connects conduit 180 and conduit 140, and cuts off communication between the conduits 136 and 140 through the pitch delay valve 138 and allowing communication between those conduits only through the orifice 144. It is to be noted that where the propeller is counterweighted, as is frequently the case, the blades will naturally tend toward coarse pitch under the influence of rotational and aerodynamic forces. This causes the cavity on the side 38 of the piston 34 to be pressurized as the piston 34 moves toward coarser pitch.

With the conduits 140 and 180 connected by the spool 164, continued flow from the fine pitch side 38 of the piston 34 is directed against the piston 108, shifting it to the right as viewed in FIG. 2 to seat against the valve seat 18. Only at this time does the flow from the fine pitch side 38 pass through the orifice 44, which now acts as a flow limiter, limiting the flow back to the conventional electro hydraulic servo valve (not shown) in the main control to a limited flow rate so that a rapid pitch change will not be effected. There will be, however, an initial flow rate greater than such limited flow rate until the piston 108 closes against the valve seat 118.

From the foregoing, it will be appreciated that a backup governing system made according to the invention provides excellent control of the propeller during situations such as overspeed for low pitch and governs the propeller at 103%+/−3% of maximum speed. The same eliminates mechanical components at the interface between the fixed and rotating propeller system parts and yet is completely compatible with conventional systems to the point where it may be readily retrofitted therewith.

We claim:

1. A variable pitch propeller system comprising:
   a rotatable propeller hub adapted to be driven by a prime mover;

a double acting piston carried by said hub;

propeller blades having shanks journaled on said hub;

a linkage connecting said piston to said shanks so that movement of said piston will cause rotation of said shanks within said hub;

a transfer bearing for providing first and second streams of hydraulic fluid under pressure, said first stream adapted to be applied to one side of said piston and said second stream being adapted to be applied to the opposite side of said piston;

a main control for regulating the pressures of said first and second streams to set the pitch of said blades on said hub; and a backup governing system carried by said hub and hydraulically interposed between said main control and said piston and including a metering valve including a metering valve member movable between a plurality of metering positions, first and second, opposing biasing elements applying oppositely directed biasing forces to said valve member, a flyweight assembly connected to said valve member applying a speed dependent valve positioning force to said valve member in opposition to said first biasing element and in addition to said second biasing element, an actuator operatively associated with said second biasing element and operable to change the bias applied by said second biasing element to said valve member, a first stream control valve connected to said actuator and interposed between said transfer bearing and said piston and operable to control the flow of said first stream to said piston one side.

2. The valve pitch propeller system of claim 1 wherein said actuator includes an actuator piston having a side hydraulically connected to said metering valve, said metering valve being operable to direct said first stream to said actuator piston side when said metering valve member is moved by said flyweight assembly to a predetermined position indicative of an undesirable occurrence in the operation of said system.

3. The valve pitch propeller system of claim 2 wherein said undesirable occurrence is a propeller overspeed condition.

4. The valve pitch propeller system of claim 2 wherein said undesirable occurrence is a propeller low pitch condition.

5. The valve pitch propeller system of claim 2 wherein said undesirable occurrence is either a propeller overspeed condition or a propeller low pitch condition.

6. The valve pitch propeller system of claim 5 further including a mass mounted for selective introduction into said flyweight assembly and a positioning linkage movable by said double acting piston and operative in the presence of a propeller low pitch condition to introduce said mass into said flyweight assembly.

7. The valve pitch propeller system of claim 1 wherein said actuator and said first stream control valve include a piston valve having a piston surface hydraulically connected to said metering valve to receive said first stream when said metering valve is moved to a predetermined position by said flyweight assembly and a valve surface for halting flow of said first stream to said double acting piston when said metering valve is moved to said predetermined position by said flyweight assembly.

8. The valve pitch propeller system of claim 1 wherein said metering valve is a spool valve and said metering valve member is a spool having opposite ends, said first biasing element and said flyweight assembly being connected to one of said spool ends and said second biasing element being connected to the other of said spool ends.

9. The valve pitch propeller system of claim 1 wherein said actuator and said first stream control valve include a piston valve having a piston surface hydraulically connected to said metering valve to receive said first stream when said metering valve is moved to a predetermined position by said flyweight assembly and a valve surface for halting flow of said first stream to said double acting piston when said metering valve is moved to said predetermined position by said flyweight assembly, said second biasing element including a spring interposed between said piston valve and said other spool end.

10. The valve pitch propeller system of claim 2 further including a reverse enabling valve hydraulically interposed between said actuator piston and said metering valve and operable to prevent said first stream from being applied to said actuator piston side.

11. The valve pitch propeller system of claim 10 wherein said reverse enabling valve is a hydraulically operated valve responsive to a hydraulic signal.

12. The valve pitch propeller system of claim 2 further including a hydraulic discharge path in fluid communication with said double acting piston one side, a flow limiter in said discharge path, and a valve operated bypass about said flow limiter.

13. The valve pitch propeller system of claim 12 wherein said flow limiter is an orifice.

14. The valve pitch propeller system of claim 12 wherein said valve operated bypass includes a hydraulically operated pitch delay valve connected to said transfer bearing to receive said second stream.

15. A variable pitch propeller system comprising:

a rotatable propeller hub adapted to be driven by a prime mover;

a double acting piston carried by said hub;

propeller blades having shanks journaled on said hub;

a linkage connecting said piston to said shanks so that movement of said piston will cause rotation of said shanks within said hub to change the pitch of said propeller blades between fine pitch and coarse pitch positions;

a transfer bearing for providing fine pitch and coarse pitch streams of hydraulic fluid under pressure, said fine pitch stream adapted to be applied to a fine pitch side of said piston and said coarse pitch stream being adapted to be applied to a coarse pitch side of said piston;

a main control for regulating the pressures of said fine pitch and coarse pitch streams to set the pitch of said blades on said hub; and a backup governing system carried by said hub and hydraulically interposed between said main control and said piston and including a spool valve including a spool movable between a plurality of metering positions, first and second, opposing biasing elements applying oppositely directed biasing forces to said valve member, a flyweight assembly connected to said spool applying a speed dependent valve positioning force to said spool in opposition to said first biasing element and in addition to said second biasing element, a piston valve operatively associated with said second biasing element and operable to change the bias applied by said second biasing element to said spool, a fine pitch stream valve surface on said piston valve and interposed between said transfer bearing and said double acting piston and operable to control the flow of said fine pitch stream to said piston fine pitch side, and a fluid passage interconnecting said piston valve and said spool valve and arranged so that when said spool valve moves to a predetermined position, said fine pitch stream is applied to said piston valve.

16. The valve pitch propeller system of claim 15 further including a reverse enabling valve in said fluid passage and operable to close the same to halt flow of said fine pitch stream to said piston valve.

17. The valve pitch propeller system of claim 15 further including a discharge passage, including said spool, connected to said fine pitch side of said piston and having a flow restriction therein, and a selectively operable pitch delay valve connected in bypass relation to said flow restriction.

18. The valve pitch propeller system of claim 15 further including a bell crank mounted for selective introduction into said flyweight assembly and a link movable by said double acting piston and operative in the presence of a propeller low pitch condition to introduce said bell crank into said flyweight assembly to cause said flyweight to act as a link causing said spool to control in response movement of said link.

19. The valve pitch propeller system of claim 18 wherein said link is a rod having one end abutting said double acting piston and an opposite end engaging said mass, said mass being mounted for movement between positions engaging and out of engagement with a flyweight in said flyweight assembly.

20. A variable pitch propeller system comprising:
 a rotatable propeller hub adapted to be driven by a prime mover;
 a double acting piston carried by said hub;
 propeller blades having shanks journaled on said hub;
 a linkage connecting said piston to said shanks so that movement of said piston will cause rotation of said shanks within said hub to change the pitch of said propeller blades between fine pitch and coarse pitch positions;
 a transfer bearing for providing fine pitch and coarse pitch streams of hydraulic fluid under pressure, said fine pitch stream adapted to be applied to a fine pitch side of said piston and said coarse pitch stream being adapted to be applied to a coarse pitch side of said piston;
 a main control for regulating the pressures of said fine pitch and coarse pitch streams to set the pitch of said blades on said hub; and
 a backup governing system carried by said hub and hydraulically interposed between said main control and said piston and including a spool valve including a spool movable between a plurality of metering positions, first and second, opposing biasing springs applying oppositely directed biasing forces to said spool, a flyweight assembly connected to said spool applying a speed dependent valve positioning force to said spool in opposition to said first spring and in addition to said second spring, a piston valve operatively abutting said second spring and operable to change the bias applied by said second spring to said spool member, a fine pitch stream control surface on said piston valve and interposed between said transfer bearing and said double acting piston and operable to control the flow of said fine pitch stream to said piston fine pitch side, and a fluid passage interconnecting said piston valve and said spool valve, whereby when said spool valve moves to a predetermined position, a hydraulic actuating signal is directed to said piston valve.

* * * * *